(12) United States Patent
Froissart et al.

(10) Patent No.: US 9,145,321 B2
(45) Date of Patent: Sep. 29, 2015

(54) DEVICE AND METHODS FOR MANUFACTURING A HOLLOW GLASS ARTICLE

(75) Inventors: Pascal Froissart, Neuville Coppegueule (FR); Sebastien Baliteau, Bouttencourt (FR)

(73) Assignee: POCHET DU COURVAL, Paris (FR)

( * ) Notice: Subject to any disclaimer, the term of this patent is extended or adjusted under 35 U.S.C. 154(b) by 311 days.

(21) Appl. No.: 13/489,423

(22) Filed: Jun. 5, 2012

(65) Prior Publication Data
US 2012/0304698 A1    Dec. 6, 2012

(30) Foreign Application Priority Data

Jun. 6, 2011    (FR) ...................................... 11 54891

(51) Int. Cl.
| | |
|---|---|
| *C03B 11/10* | (2006.01) |
| *C03B 9/32* | (2006.01) |
| *C03B 9/193* | (2006.01) |
| *B44B 5/00* | (2006.01) |
| *C03B 9/195* | (2006.01) |
| *C03B 23/00* | (2006.01) |

(52) U.S. Cl.
CPC .............. *C03B 9/1932* (2013.01); *B44B 5/0004* (2013.01); *C03B 9/195* (2013.01); *C03B 9/32* (2013.01); *C03B 11/10* (2013.01); *C03B 23/0013* (2013.01)

(58) Field of Classification Search
CPC .......... C03B 11/10; C03B 9/1932; C03B 9/32
USPC .................................... 65/261–267, 305–322
See application file for complete search history.

(56) References Cited

U.S. PATENT DOCUMENTS

| | | | |
|---|---|---|---|
| 1,407,550 A * | 2/1922 | Lapp | 264/319 |
| 6,134,920 A * | 10/2000 | Hjertman et al. | 65/108 |
| 2003/0026924 A1* | 2/2003 | Fait et al. | 428/34.1 |
| 2006/0213632 A1* | 9/2006 | Vogt et al. | 164/6 |
| 2009/0084799 A1* | 4/2009 | Mondon | 220/674 |

FOREIGN PATENT DOCUMENTS

| | | | | |
|---|---|---|---|---|
| EP | 0346792 | * | 12/1982 | .............. C03B 9/32 |
| EP | 1 656 859 A2 | | 5/2006 | |
| EP | 1656859 A2 | * | 5/2006 | |
| FR | 2966453 A1 | | 10/2010 | |
| JP | 2003095671 A | | 4/2003 | |

OTHER PUBLICATIONS

Seifferth Karl EP0346792 Machine Translation as Provided by http://translationportal.epo.org/emtp/translate/?ACTION=description-retrieval&COUNTRY=EP&ENGINE=google&FORMAT=docdb&KIND=A1&LOCALE=en_EP&NUMBER=0346792&OPS=ops.epo.org/3.1&SRCLANG=de&TRGLANG=en ONJul. 23, 2014.*

* cited by examiner

*Primary Examiner* — Jodi C Franklin
(74) *Attorney, Agent, or Firm* — McDermott Will & Emery LLP

(57) ABSTRACT

The manufacturing device comprises at least one mold (9) and a punch (20) displaceable between a passive position outside said at least one mold (9) and an active position inside said at least one mold (9). The punch (20) includes at least one marking portion (25) provided with at least one raised and/or recessed pattern (26) and radially displaceable by actuation means (30) into the active position of the punch (20), between a retracted position and a protruding position applied against the internal face (8) of the side wall (6) for imprinting on this internal face (8) said at least one raised and/or recessed pattern.

9 Claims, 3 Drawing Sheets

DEVICE AND METHODS FOR MANUFACTURING A HOLLOW GLASS ARTICLE

CROSS REFERENCE TO RELATED APPLICATIONS

Figure 1:
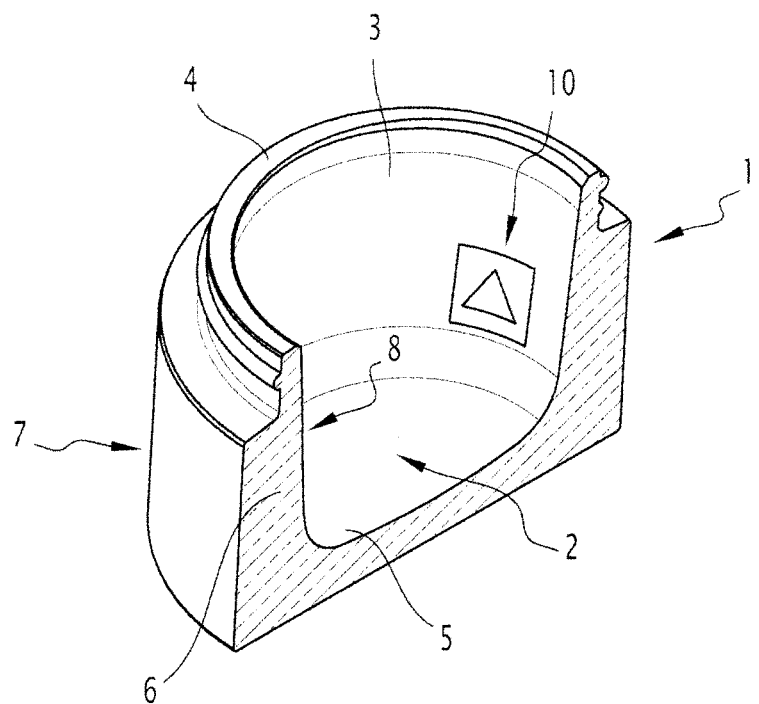

The present application claims priority under 35 U.S.C. §119 to French Patent Application No. 1154891, filed on Jun. 6, 2011, which is incorporated herein by reference.

The present invention relates to a device and to methods for manufacturing a hollow glass article.

The invention also relates to hollow glass articles obtained with such a manufacturing device.

Hollow glass articles, such as for example flasks or pots, are obtained by depositing at least one drop of molten glass, also called a gob, in an imprint of a blank mold. A blank is preformed in this blank mold by means of a punch or by blowing a gas into the imprint of said mold.

Next, the thereby made blank is removed from the mold and transferred for example by a manipulator arm, into a finishing mold for definitively forming the glass article by gas-blowing.

In order to customize this type of glass articles, making one or several raised and/or recessed patterns on the external face is known. For this, the imprint of the finishing mold includes one or several raised and/or recessed patterns which, during the step for definitive formation of the article in the finishing mold, will be inlaid on the external face of this glass article because of malleability of the glass.

But, certain users of glass articles, notably in the field of perfumery and cosmetics, seek to customize the glass articles which they use, by making raised and/or recessed decorations inside, recalling or suggesting the brand and/or the product contained in the articles. The decoration(s) inside may be independent of the shape of the article and these patterns or decorations may be particular optical effects for example.

The object of the invention is to propose a manufacturing device and methods with which this type of intervention inside glass articles may be achieved.

Therefore the object of the invention is a device for manufacturing a hollow glass article defining a container including an aperture, a bottom opposite said aperture and at least one side wall delimited by an external face and an internal face, said device comprising at least one mold and a punch which may be displaced between a passive position outside said at least one mold and an active position inside said at least one mold, characterized in that the punch includes at least one marking portion provided with at least one raised and/or recessed pattern, radially displaceable by actuation means, in the active position of the punch, between a retracted position and a protruding position applied against the internal face of the side wall in order to imprint on this internal face said at least one raised and/or recessed pattern.

The device according to the invention may comprise one or several of the following features, taken individually or according to all technically possible combinations:
said at least one mold is a blank mold,
said at least one mold is a finishing mold,
the punch is formed by a hollow part and the actuation means comprise a piston displaceable inside the punch along the axis of the article by a control means between a first position in which said at least one marking portion is in the retracted position and a second position in which said at least one marking portion is in a protruding position,
the piston includes, at its free end, a frusto-conical portion provided with at least one groove cooperating with a tenon integral with the marking portion and with a shape mating said groove, and
the groove has a slope directed towards the center of the bottom of the article.

The invention relates to a first method for manufacturing a hollow glass article by means of such a device, characterized in that it consists in the following steps:
at least one drop of molten glass is deposited in an imprint of a blank mold,
a first punch is introduced into the imprint of the blank mold in order to form a blank,
after having withdrawn the first punch, in the blank mold, a gas is injected into the blank in order to form the article,
a second punch including at least one marking portion provided with at least one raised and/or recessed pattern and radially displaceable is introduced into the article,
said at least one marking portion is radially displaced between a retracted position and a protruding position applied against the internal face of the side wall of the article in order to imprint on this internal face said at least one pattern,
said at least one marking portion is brought back into its retracted position and the second punch is withdrawn.

The object of the invention is a second method for manufacturing a hollow glass article by means of such a device, characterized in that it consists in the following steps:
at least one drop of molten glass is deposited in an imprint of a blank mold,
a punch is introduced into the imprint of the blank mold in order to form the article, said punch including at least one marking portion provided with at least one raised and/or recessed pattern and radially displaceable,
said at least one marking position is radially displaced between a retracted position and a protruding position applied against the internal face of the side wall of the article in order to imprint on this internal face said at least one pattern,
said at least one marking portion is brought back into its retracted position and the punch is withdrawn.

The object of the invention is also a third method for manufacturing a hollow glass articles by means of such a device, characterized in that it consists in the following steps:
at least one drop of molten glass is deposited in an imprint of a blank mold,
a punch is introduced into the imprint of the blank mold in order to form a blank,
after having withdrawn the punch, the blank is transferred into a finishing mold and gas is injected into the blank in order to form the article,
a punch including at least one marking portion provided with at least one raised and/or recessed pattern and radially displaceable is introduced into the article,
said at least one marking portion is radially displaced between a retracted position and a protruding position applied against the internal face of the side wall of the article in order to imprint on said internal face said at least one pattern, and
said at least one marking portion is brought back into its retracted position and the punch is withdrawn.

The object of the invention is also a hollow glass article defining a container including an aperture, a bottom opposite to said aperture and at least one side wall delimited by an internal face and an external face, characterized that in the internal face of said at least one side wall includes at least one raised and/or recessed pattern made by means of a manufacturing device as mentioned earlier.

Figure 3:
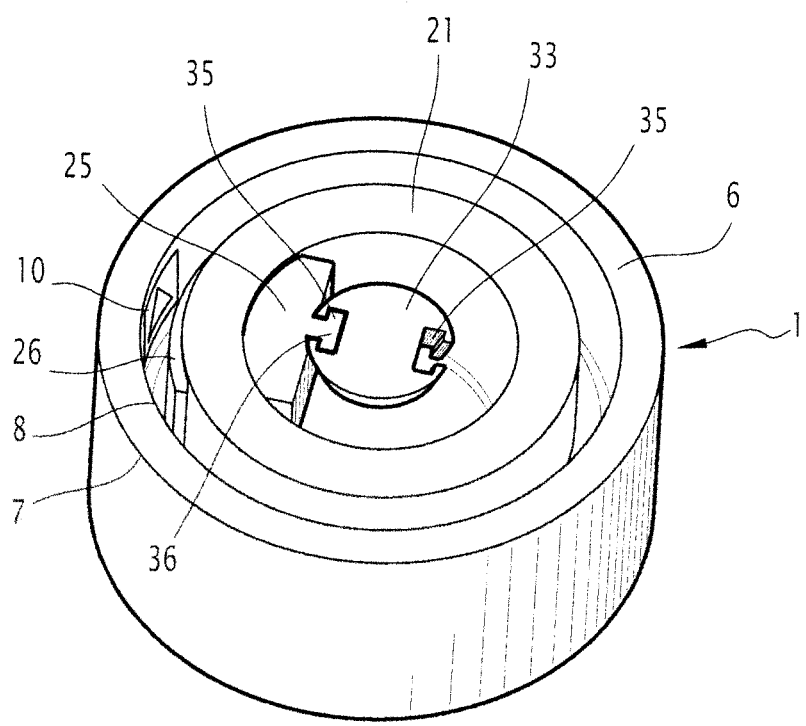
Figure 2:
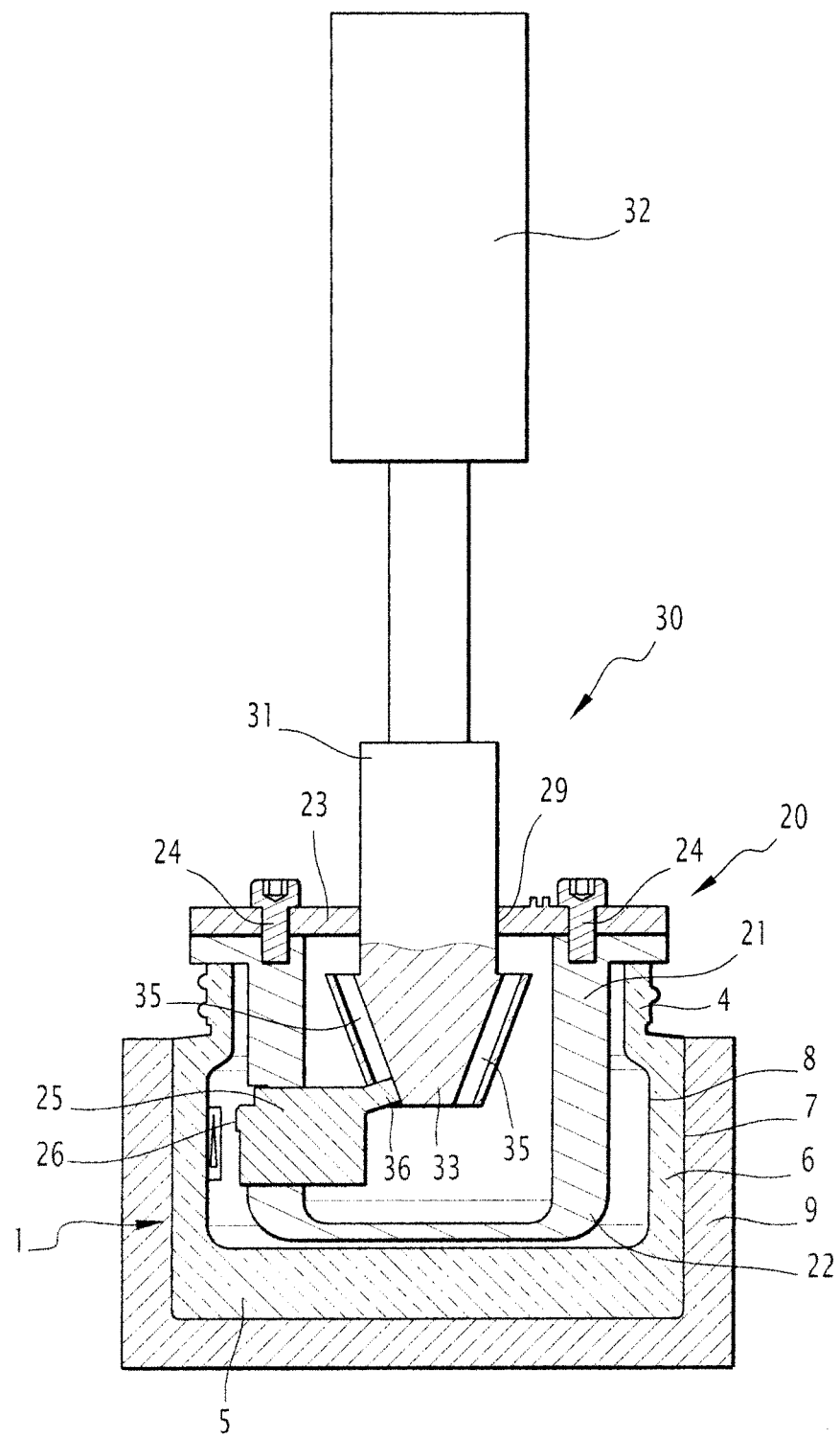
Figure 4:
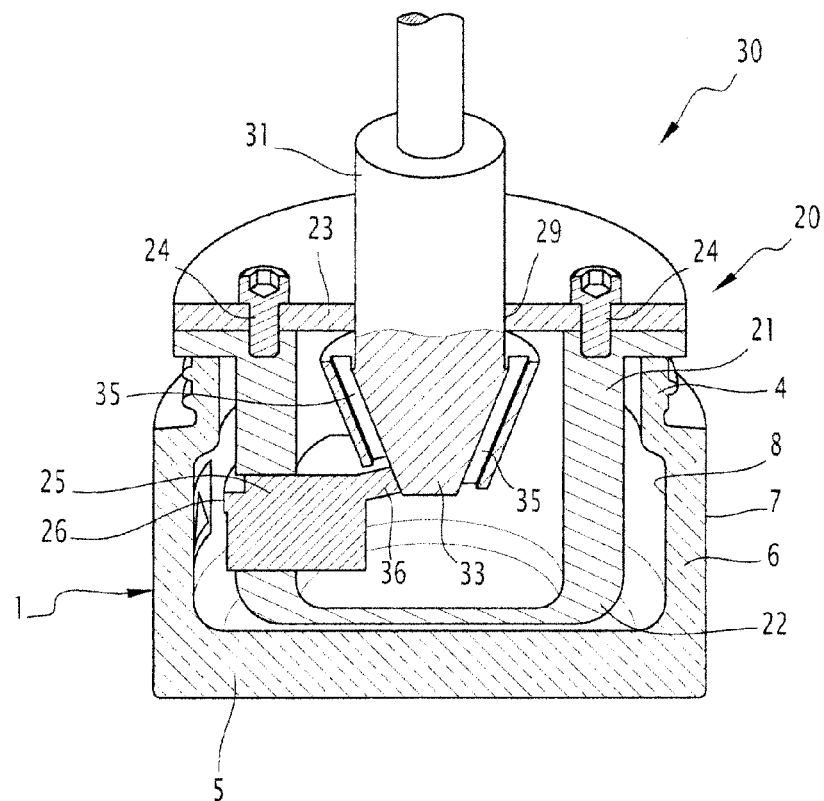
Figure 5:
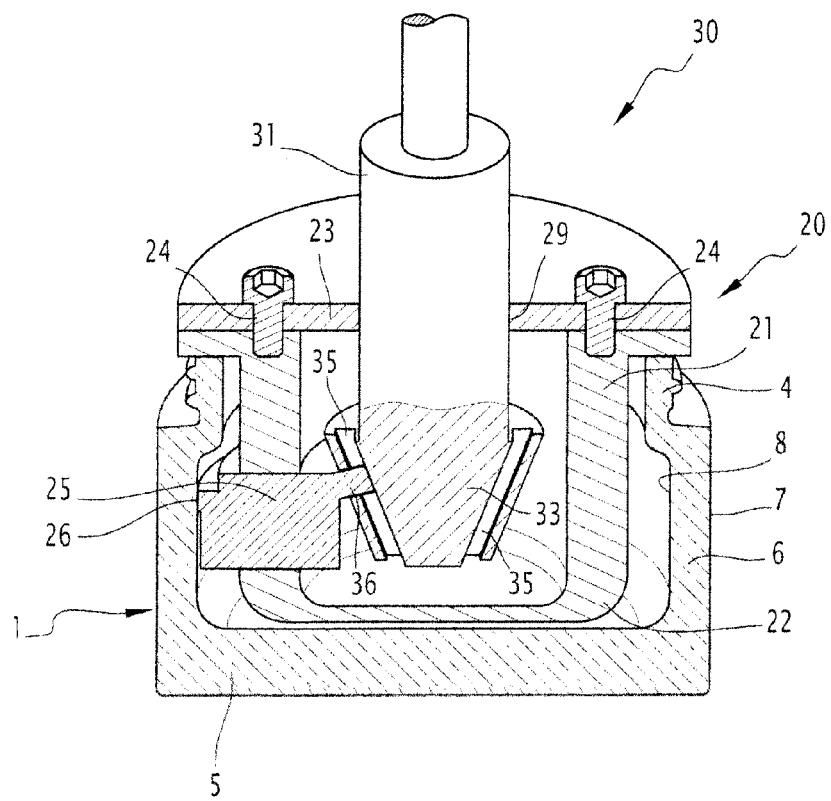

The features and advantages of the invention will become apparent during the description which follows, given as an example and made with reference to the appended drawings, wherein:

FIG. 1 is a schematic perspective and vertical sectional view of a glass article interiorly including a raised and/or recessed pattern and obtained by means of a manufacturing device according to the invention, FIG. 2 is a schematic elevational and vertical sectional view of the manufacturing device according to the invention, FIG. 3 is a schematic perspective and cross-sectional view of a punch of the manufacturing device according to the invention, and FIGS. 4 and 5 are schematic elevational and vertical sectional views showing displacement of a marking portion of the punch of the manufacturing device according to the invention.

In FIG. 1, a hollow glass article designated as a whole by reference 1 is schematically illustrated in a vertical sectional view.

Article 1 defines a container 2 comprising an aperture 3 delimited by a neck 4 and bottom 5 opposite to said aperture 3. The container of the article 1 also comprises at least one side wall 6 delimited by an external face 7 and an internal face 8.

In the exemplary embodiment illustrated in the figures, the glass article 1 has a general circular shape, this glass article 1 may have quite another shape, such as for example a general parallelepipedal shape.

As shown in FIG. 1, the internal face 8 of the side wall 6 includes at least one raised and/or recessed pattern 10 made by the manufacturing method, according to the invention. The internal face 8 of the side wall 6 may include several raised and/or recessed patterns 10 of various shapes.

Generally, glass articles 1 of this type, such as for example flasks or pots, are obtained by depositing at least one drop of molten glass, also called a gob, in an imprint of a blank mold. A blank is preformed in this blank mold by means of a punch and by blowing gas into the imprint of said mold.

Next, the thereby made blank is removed from the mold and transferred for example by a manipulator arm, not shown, into a finishing mold in order to definitively form the glass article by gas-blowing.

In the exemplary embodiment illustrated in FIGS. 2 to 5, the glass article 1 was formed beforehand in a blank mold, not shown, in order to obtain a blank and this blank was transferred into a finishing mold 9, the glass being in the malleable state.

In this finishing mold, a gas is injected inside the blank in order to form the article 1, as shown in FIG. 2.

The manufacturing device comprises a punch designated as a whole by reference 20 which may be used in a blank mold or a finishing mold.

The punch 20 is displaceable between a passive position outside the mold 9 or an active position inside this mold 9.

As this appears in FIG. 2, the punch 20 is formed with a hollow part 21 with a circular section and closed at its lower portion by a bottom 22. The upper portion of the part 22 includes an aperture closed by a lid 23 attached on the part 21 by suitable members, such as for example screwing members 24.

The part 21 of the punch 20 includes at least one marking portion 25 provided, on its external face located outside the part 21, with at least one raised and/or recessed pattern 26.

In the exemplary embodiment illustrated in the figures, the punch 20 includes a single marking portion 25.

According to an alternative, this punch 20 may include several marking portions 25 distributed at the periphery of the part 21.

The marking portion 25 is radially displaceable by actuating means 30, in the active position of the punch 20, between a retracted position illustrated in FIGS. 2 and 4 and a protruding position illustrated in FIG. 5 applied against the internal face 8 of the side wall 6 in order to imprint on this internal face 8 said at least one pattern 26 in order to produce the raised and/or recessed pattern 10.

As shown in FIG. 2, the actuation means 30 comprise a piston 31 displaceable inside the part 21 of the punch 20. This piston 31 crossed the lid 23 through a central orifice 29.

The piston 31 is displaceable in the axis of article 1 by a control means 32 between a first position in which the marking portion 25 is in a retracted position (FIGS. 2 and 4) and a second position in which said marking portion 25 is in a protruding position (FIG. 5).

The control means 32 is formed by a hydraulic or pneumatic cylinder or by any other suitable member of a known type.

The piston 31 includes at its free end, a frusto-conical portion 33, the small base of which is located at the free end of the piston 31.

As more particularly shown in FIGS. 3 and 4, the frusto-conical portion 33 includes at least one groove 35 having a slope directed towards the center of the bottom 5 of the article 1.

In the exemplary embodiment illustrated in the figures, the frusto-conical portion 33 includes two opposite grooves 35, a single one of which is associated with a marking portion 25. For this, the marking position 25 includes a tenon 36 with a shape mating said groove 35.

The marking of the internal face 8 in a finishing mold, not shown, after having formed article 1, is made in the following way.

When the control member 32 is actuated, the piston 31 slides in the aperture 29 made in the lid 23 and moves along the axis of the article 1 towards the bottom 22 of the part 21, i.e. towards the bottom 5 of the article 1. As the marking portion 25 is maintained in the part 21, the tenon 36 slides in the groove 25 of the frusto-conical portion 33 of the piston 31 which causes, because of the slope of this groove 35, the radial displacement of the marking portion 25 towards the internal face 8 of the side wall 6 of the article 1.

The thereby exerted force allows the pattern 26 to be imprinted on the internal face 8 in order to produce the raised and/or recessed pattern 10, the glass being in the malleable state.

In the case when it is desired to produce the marking of the internal face 8 in a blank mold, it is proceeded in the following way.

First of all, at least one drop of molten glass is deposited in an imprint of a blank mold, not shown, and a first punch is introduced into the imprint of this blank mold in order to form a blank. After having withdrawn this first punch, in the blank mold, gas is injected into the blank in order to form the article 1.

Next, the punch 20 is introduced into the article 1 and the marking portion 25 is displaced radially by means of the piston 31 and of the control member 32.

This marking portion 25 is thus radially displaced between a retracted position and a protruding position applied against the internal face 8 of the side wall 6 of the article 1 in order to imprint on this internal face at least one raised and/or recessed pattern 10. Next, the marking portion 25 is brought back into its retracted position by means of the piston 31 and of the control member 32 and the punch 20 is withdrawn.

According to an alternative, the article 1 may be transferred into a finishing mold, not shown, and gas is injected into the article 1 in order to increase its volume.

According to an alternative, after having deposited in an imprint of a blank mold, at least one drop of molten glass, the punch 20 is directly introduced into the imprint of this blank mold in order to form the article 1 and also for producing the raised and/or recessed pattern 10 by radial displacement of the marking portion 25, in an identical way with that of the previous embodiments.

According to an alternative, the article 1 may then be transferred into a finishing mold, not shown, and gas is injected into the article 1 in order to increase its volume.

The pressure applied by the marking portion 25 allows penetration of the pattern 26 into the glass, still in the malleable state of the article 1, without altering the general geometry of this article 1. The temperature of the glass has to be sufficiently high in order to allow deformation of the internal face 8 of the side wall 6.

The marking of the internal face 8 of the side wall 6 of the article 1 may occur before, after or jointly with a blowing operation intended to form the article or to maintain it with an internal pressure.

The temperature of the pattern(s) 26 formed on the marking portion 25 may be controlled in order to ensure rendering quality and to suppress the adhesive bonding or deformation effect. These pattern(s) 26 may be made in steel or in cast iron. These materials may be coated with a hot sprayed metal layer in order to improve the performances thereof.

The thereby formed pattern(s) on the internal face 8 of the side wall 6 of the glass article 1 may then be decorated either partly or totally.

Finally, the lower face of the frusto-conical portion 33, i.e. its small base, may also include at least one raised and/or recessed pattern, not shown, allowing said at least one pattern to be imprinted on the internal face of the bottom 5 of the article 1 in the protruding position of said at least one marking portion 25.

The invention claimed is:

1. A device for manufacturing a hollow glass article defining a container comprising an aperture, a bottom opposite to said aperture and at least one side wall delimited by an external face and an internal face, said device comprising:
    at least one mold and a punch displaceable between a passive position outside said at least one mold and an active position inside said at least one mold,
    wherein the punch includes at least one marking portion provided with at least one raised or recessed pattern and said marking portion structurally configured to be radially displaceable with respect to the punch by an actuation device, in the active position of the punch, between a retracted position and protruding position applied against the internal face of the side wall in order to imprint on this internal face said at least one raised or recessed pattern.

2. The device according to claim 1, wherein said at least one mold is a blank mold.

3. The device according to claim 1, wherein said at least one mold is a finishing mold.

4. The device according to claim 1, wherein the punch is formed by a hollow part and the actuation device comprises a piston displaceable inside the punch along an axis of the article by a controller between a first position in which said at least one marking portion is in a retracted position and a second position in which said at least one marking portion is in a protruding position.

5. The device according to claim 4, wherein the piston comprises, at its free end, a frusto-conical portion provided with at least one groove cooperating with a tenon integral with the marking portion and with a shape mating said groove.

6. The device according to claim 5, wherein the groove has a slope directed towards the center of the bottom of the article.

7. A method for manufacturing a hollow glass article comprising a device according to claim 1, comprising the following steps:
    depositing at least one drop of molten glass in an imprint of a blank mold,
    introducing a first punch forming a blank into the imprint of the blank mold,
    injecting a gas into the blank in order to form the article, after having withdrawn the first punch from the blank mold,
    introducing into the blank a second punch including at least one marking portion provided with at least one raised or recessed pattern and radially displaceable,
    displacing said at least one marking portion radially between a retracted position and a protruding position applied against the internal face of the side wall of the article, in order to imprint on this internal face, said at least one pattern, and
    retracting said at least one marking portion into its retracted position and the second punch is withdrawn.

8. A method for manufacturing a hollow glass article comprising a device according to claim 1, comprising the following steps:
    depositing at least one drop of molten glass in an imprint of a blank mold,
    introducing a punch into the imprint of the blank mold in order to form the article, said punch including at least one marking portion provided with at least one raised or recessed pattern and radially displaceable,
    displacing said at least one marking portion radially between a retracted position and a protruding position applied against the internal face of the side wall of the article in order to imprint on this internal face, said at least one pattern, and
    retracting said at least one marking portion back into its retracted position and the punch is withdrawn.

9. A method for manufacturing a hollow glass article comprising a device according to claim 1, comprising the following steps:
    depositing at least one drop of molten glass in an imprint of a blank mold,
    introducing a punch into the imprint of the blank mold in order to form a blank,
    after having withdrawn the punch, transferring the blank into a finishing mold and injecting a gas into the blank in order to form the glass article,
    providing a punch including at least one marking portion with at least one raised or recessed pattern and is radially displaceable,
    displacing said at least one marking portion radially between a retracted position and a protruding position applied against the internal face of the side wall of the article in order to imprint on this internal face said at least one pattern, and
    retracting said at least one marking portion back into its retracted position and the punch is withdrawn.

* * * * *